US007343023B2

(12) United States Patent
Nordqvist et al.

(10) Patent No.: US 7,343,023 B2
(45) Date of Patent: Mar. 11, 2008

(54) HEARING PROSTHESIS WITH AUTOMATIC CLASSIFICATION OF THE LISTENING ENVIRONMENT

(75) Inventors: Nils Peter Nordqvist, Sollentuna (SE); Arne Leijon, Stockholm (SE)

(73) Assignee: GN ReSound A/S (DK)

( * ) Notice: Subject to any disclaimer, the term of this patent is extended or adjusted under 35 U.S.C. 154(b) by 403 days.

(21) Appl. No.: 10/023,264

(22) Filed: Dec. 18, 2001

(65) Prior Publication Data

US 2002/0191799 A1 Dec. 19, 2002

Related U.S. Application Data

(63) Continuation of application No. PCT/DK01/00226, filed on Apr. 4, 2001.

(30) Foreign Application Priority Data

Apr. 4, 2000 (DK) .............................. 2000 00554
Apr. 4, 2001 (WO) ............................. 01/76321 A1

(51) Int. Cl.
*H04R 25/00* (2006.01)
*G10L 15/14* (2006.01)

(52) U.S. Cl. ...................... 381/321; 381/320; 381/317; 704/256

(58) Field of Classification Search ............... 381/23.1, 381/60, 312, 317, 320, 321; 704/233, 255, 704/256, 257, 271, 200.1
See application file for complete search history.

(56) References Cited

U.S. PATENT DOCUMENTS 5,535,305 A 7/1996 Acero et al. ............... 395/2.65
5,687,241 A 11/1997 Ludvigsen ................. 381/68.4
2002/0037087 A1* 3/2002 Allegro et al. .............. 381/317

FOREIGN PATENT DOCUMENTS

EP 0 869 478 A2 3/1998
EP 0881 625 A2 5/1998
JP 08350940 12/1996
WO WO 98/27787 12/1996

OTHER PUBLICATIONS

S. Oberle, et al., "HMM-Based Speech Enhancement Using Pitch Period Information in Voiced Speech Segments", 1997 IEEE International Symposium on Circuits and Systems, Jun. 9-12, 1997 Hong Kong, pp. 2645-2648.

S. Oberle, et al., "Recognition of Acoustical Alarm Signals for the Profoundly Deaf Using Hidden Markov Models", IEEE International Symposium on Circuits and Systems, 1995, No. 3, pp. 2285-2288.

L.R. Rabiner, "A Tutorial on Hidden Markov Models and Selected Applications in Speech Recognition", Proceedings of the IEEE, vol. 77, No. 2, Feb. 1989, pp. 257-286.

* cited by examiner

*Primary Examiner*—Brian Ensey
(74) *Attorney, Agent, or Firm*—Bingham McCutchen LLP

(57) ABSTRACT

A hearing prosthesis that automatically adjusts itself to a surrounding listening environment is provided. In one aspect, the automatic adjustment is achieved by controlling one or several algorithm parameters of a predetermined signal processing algorithm. In another aspect, the signal input to the hearing prosthesis is continuously and automatically classified as belonging to one of several everyday listening environments, the results of the classification being communicated to the processing means thus allowing the processing means to control the algorithm parameters.

134 Claims, 3 Drawing Sheets

HEARING PROSTHESIS WITH AUTOMATIC CLASSIFICATION OF THE LISTENING ENVIRONMENT

RELATED APPLICATION DATA

This application is a continuation of PCT Patent Application PCT/DK01/00226, filed Apr. 4, 2001, which claims priority from Danish Patent Application PA 2000 00554, filed Apr. 4, 2000.

FIELD OF THE INVENTION

The present invention relates to a hearing prosthesis and method providing automatic identification or classification of a listening environment by applying one or several predetermined Hidden Markov Models to process acoustic signals obtained from the listening environment.

BACKGROUND OF THE INVENTION

Today's digitally controlled or Digital Signal Processing (DSP) hearing instruments are often provided with a number of pre-set listening programs. These pre-set listening programs are often included to accommodate a comfortable and intelligible reproduced sound quality in differing listening environments. Audio signals obtained from these listening environments may have highly different characteristics, e.g. in terms of average and maximum sound pressure levels (SPLs) and/or frequency content. Therefore, for DSP based hearing prosthesis, each type of listening environment may require a particular setting of algorithm parameters of a signal processing algorithm of the hearing prosthesis to ensure that the user is provided with an optimum reproduced signal quality in all types of listening environments. Algorithm parameters that typically could be adjusted from one listening program to another include parameters related to broadband gain, corner frequencies or slopes of frequency-selective filter algorithms and parameters controlling e.g. knee-points and compression ratios of Automatic Gain Control (AGC) algorithms. Consequently, today's DSP based hearing aids are usually provided with a number of different pre-set listening programs, each tailored to a particular listening environment and/or particular user preferences. Characteristics of these pre-set listening programs are typically determined during an initial fitting session in a dispenser's office and programmed into the aid by transmitting or activating corresponding algorithms and algorithm parameters to a non-volatile memory area of the hearing prosthesis.

The hearing aid user is subsequently left with the task of manually selecting, typically by actuating a push-button on the hearing aid or a program button on a remote control, between the pre-set listening programs in accordance with the current listening or sound environment. Accordingly, when attending and leaving the multitude of sound environments in his/hers daily whereabouts, the hearing aid user may have to devote his attention to the delivered sound quality and continuously search for the best program setting in terms of comfortable sound quality and/or the best speech intelligibility.

In the past there have been made attempts to adapt signal processing characteristics of a hearing aid to the type of listening environment that the user is situated in. U.S. Pat. No. 5,687,241 discloses a multi-channel DSP based hearing instrument that utilises continuous determination or calculation of one or several percentile value of input signal amplitude distributions to discriminate between speech and noise input signals in the listening environment. Gain values in the frequency channels are subsequently altered in response to the detected levels of speech and noise.

SUMMARY OF THE INVENTION

One object of the invention is to provide a hearing prosthesis that automatically adjusts itself to a surrounding listening environment by controlling one or several algorithm parameters of a predetermined signal processing algorithm to allow a user to automatically obtain intelligible and comfortable amplified sound in variety of different listening environments.

It is another object of the invention provide a hearing prosthesis that continuously and automatically classifies an input signal as belonging to one of several everyday listening environments and indicates the classification results to processing means to allow the latter to perform the above-mentioned control of the algorithm parameters.

DESCRIPTION OF THE INVENTION

A first aspect of the invention relates to a hearing prosthesis comprising a microphone adapted to generate an input signal in response to receiving an acoustic signal from a listening environment, an output transducer for converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined processing algorithm, the processing means being further adapted to:

segment the input signal into consecutive signal frames of time duration, $T_{frame}$, and generate respective feature vectors, O(t), representing predetermined signal features of the consecutive signal frames, process the feature vectors with at least one Hidden Markov Model, $\lambda^{source}=\{A^{source}, b(O(t)), \alpha_0^{source}\}$, associated with a predetermined sound source to determine an element value(s) of a classification vector indicating a probability of the predetermined sound source being active in the listening environment, control one or several values of the related algorithm parameters in dependence of element value(s) of the classification vector. Thereby, characteristics of the predetermined signal processing algorithm are adapted to the current listening environment. The at least one Hidden Markov Model (HMM) comprising:

$A^{source}$=A state transition probability matrix;

b(O(t))=Probability function for the input observation O(t) for each state of the at least one Hidden Markov Model;

$\alpha_0^{source}$=An initial state probability distribution vector.

The hearing prosthesis may be a hearing instrument or aid such as a Behind The Ear (BTE), an In The Ear (ITE) or Completely In the Canal (CIC) hearing aid. The input signal generated by the microphone may be an analogue signal or a digital signal in a multi-bit format or in single bit format generated by a microphone amplifier/buffer or an integrated analogue-to-digital converter, respectively. Preferably, the input signal to the processing means is provided as a digital input signal. Therefore, in case the microphone signal is provided in analogue form, it is preferably converted into a corresponding digital input signal by a suitable analogue-to-digital converter (A/D converter) which may be included in an integrated circuit of the hearing prosthesis. The microphone signal may be subjected to various signal processing operations such as amplification and bandwidth limiting before being applied to the AID converter and other operations afterwards such as decimation before the digital input signal is applied to the processing means.

The output transducer that converts the processed output signal into an acoustic or electrical signal or signals may be a conventional hearing aid speaker often called a "receiver" or another sound pressure transducer producing a perceivable acoustic signal to the user of the hearing prosthesis. The output transducer may also comprise a number of electrodes that may be operatively connected to the user's auditory nerve or nerves.

In the present specification and claims the term "predetermined signal processing algorithm" designates any processing algorithm, executed by the processing means of the hearing prosthesis, that generates the processed output signal from the input signal. Accordingly, the "predetermined signal processing algorithm" may comprise a plurality of sub-algorithms or sub-routines that each performs a particular subtask in the predetermined signal processing algorithm. As an example, the predetermined signal processing algorithm may comprise different signal processing sub-routines such as frequency selective filtering, single or multi-channel compression, adaptive feedback cancellation, speech detection and noise reduction, etc.

Furthermore, several distinct selections of the above-mentioned signal processing sub-routines may be grouped together to form two, three or more different pre-set listening programs which the user may be able to select between in accordance with his/hers preferences.

The predetermined signal processing algorithm will have one or several related algorithm parameters. These algorithm parameters can usually be divided into a number of smaller parameters sets, where each such algorithm parameter set is related to a particular part of the predetermined signal processing algorithm or to particular sub-routine as explained above. These parameter sets control certain characteristics of their respective subroutines such as corner-frequencies and slopes of filters, compression thresholds and ratios of compressor algorithms, adaptation rates and probe signal characteristics of adaptive feedback cancellation algorithms, etc.

Values of the algorithm parameters are preferably intermediately stored in a volatile data memory area of the processing means such as a data RAM area during execution of the predetermined signal processing algorithm. Initial values of the algorithm parameters are stored in a non-volatile memory area such as an EEPROM/Flash memory area or battery backed-up RAM memory area to allow these algorithm parameters to be retained during power supply interruptions, usually caused by the user's removal or replacement of the hearing aid's battery or manipulation of an ON/OFF switch.

The processing means may comprise one or several processors and its/their associated memory circuitry. The processor may be constituted by a fixed point or floating point Digital Signal Processor (DSP) with a single or dual MAC architecture that performs both the calculations required in the predetermined signal processing algorithm as well a number of so-called household tasks such as monitoring and reading values of external interface signals and programming ports. Alternatively, the processing means may comprise a DSP that performs number crunching, i.e. multiplication, addition, division, etc. while a commercially available, or even proprietary, microprocessor kernel handles the household tasks which mostly involve logic operations and decision making.

The DSP may be a software programmable type executing the predetermined signal processing algorithm in accordance with instructions stored in an associated program RAM area. A data RAM area integrated with the processing means may store initial and intermediate values of the related algorithm parameters and other data variables during execution of the predetermined signal processing algorithm as well as various other household variables. Such a software programmable DSP may be advantageous for some applications due to the possibility of rapidly implementing and testing modifications of the predetermined signal processing algorithm. Clearly, the same advantages apply to sub-routines that handle the household tasks. Alternatively, the processing means may be constituted by a hard-wired DSP core so as to execute one or several fixed predetermined signal processing algorithm(s) in accordance with a fixed set of instructions from an associated logic controller. In this type of hard-wired processor architecture, the memory area storing values of the related algorithm parameters may be provided in the form of a register file or as a RAM area if the number of algorithm parameters justifies the latter solution.

According to the invention, the processing means are further adapted to segment the input signal into consecutive signal frames of duration $T_{frame}$ and generate respective feature vectors, O(t), representing predetermined signal features of the consecutive signal frames. The feature vectors are subsequently processed with at least one Hidden Markov Model, $\lambda^{source}=\{A^{source}, b(O(t)), \alpha_0^{source}\}$, associated with a predetermined sound source to determine element value(s) of a classification vector. This classification vector indicates a probability of the predetermined sound source being active in the current listening environment. By controlling one or several values of the algorithm parameters related to the predetermined signal processing algorithm in dependence of element value(s) of the classification vector, the processing of the input signal is adapted to the listening environment in dependence of these element value(s). The consecutive signal frames may be non-overlapping or overlapping with a predetermined amount of overlap, e.g. overlapping with between 10%-50% to avoid sharp discontinuities at boundaries between neighbouring signal frames and/or counteract window effects of any applied window function, such as a Hanning window, at the boundaries. While the above-mentioned frame segmentation of the input signal is required for the purpose of generating the feature vectors, O(t), and process these with the at least one Hidden Markov Model, the predetermined signal processing algorithm may process the input signal on a sample-by-sample basis or on a frame-by-frame basis with a frame time equal to or different from $T_{frame}$.

The at least one Hidden Markov Model may comprise at least one discrete Hidden Markov Model, $\lambda^{source}=\{A^{source}, B^{source}, \alpha_0^{source}\}$, wherein $B^{source}$ is an observation symbol probability distribution matrix which serves as a discrete equivalent of the general function, b(O(t)), defining the probability function for the input observation O(t) for each state of a Hidden Markov Model. In this discrete case, the processing means are preferably adapted to compare each of the respective feature vectors, O(t), with a feature vector set, often denoted a "codebook", to determine, for substantially each of the feature vectors, an associated symbol value so as to generate an observation sequence of symbol values associated with the consecutive signal frames. This process of determining symbol values from the feature vectors is commonly referred to as "vector quantization". Thereafter, the observation sequence of symbol values is processed with the at least one discrete Hidden Markov Model, $\lambda^{source}$, which is associated with the predetermined sound source to determine the element value(s) of the classification vector.

According to a preferred embodiment of the invention, the processing means are adapted to process the feature vectors with a plurality of Hidden Markov Models, or process the observation sequence of symbol values with a plurality of discrete Hidden Markov Models. Each of the discrete Hidden Markov Models or each of the Hidden Markov Models is preferably associated with a respective predetermined sound source to determine the element values of the classification vector. Each element value may directly represent a probability (i.e. a value between 0 and 1) of the associated predetermined sound source being active in the current listening environment.

The duration of one of the signal frames, $T_{frame}$, is preferably selected to be within the range 1-100 milliseconds, such as about 5-10 milliseconds. Such time duration allow the applied Hidden Markov Model(s) to operate on time scales of the input signal that are comparable to individual features, e.g. phonemes, of speech signals and on envelope modulations of a number of relevant acoustic noise sources.

A predetermined sound source may be any natural or synthetic sound source such as a natural speech source, a telephone speech source, a traffic noise source, multi-talker or babble source, subway noise source, transient noise source or a wind noise source. A predetermined sound source may also be constituted by a mixture of a natural speech and/or traffic noise and/or or babble mixed together in a predetermined proportions to e.g. create a particular signal to noise ratio(snr) in that predetermined sound source. For example, a predetermined sound source may be speech and babble mixed in a proportion that creates a particular target snr such as 5 dB or 10 dB or more preferably 20 dB. The Hidden Markov Model associated with such a mixed speech-babble sound source will then through the classification vector be able indicate how well a current input signal or signals fit this speech-babble sound source. The processing means can consequently select appropriate signal processing parameters based on both the interfering noise type and the actual signal to noise ratio.

Temporal and spectral characteristics of each of these predetermined sound sources may have been obtained based on real-life recordings of one or several representative sound sources. The temporal and spectral characteristics for each type of predetermined sound source are preferably obtained by performing real-life recording of a number of such representative sound sources and concatenate these recordings in a single recording (or sound file). For speech sound sources, the present inventors have found that utilising about 10 different speakers, preferably 5 males and 5 females, will generally provide good classification results in the Hidden Markov Model associated with the speech source. The mixed sound source type is preferably provided by post-processing of one or several of the real-life recordings to obtain desired specific characteristics of the mixed sound source such as a predetermined signal to noise ratio.

When the concatenated sound source recording has been formed, feature vectors, preferably identical to those feature vectors that are generated by the processor means in the hearing prosthesis, are extracted from the concatenated sound source recording to form a training observation sequence for the associated continuous or discrete HMM. The duration of the training sequence depends on the type of sound source, but it has been found that a duration of about 3-20 minutes, such as about 4-6 minutes is adequate for many types of sound sources including speech sound sources. Thereafter, for each predetermined sound source, the corresponding HMM is trained with the generated training observation sequence, preferably, by the Baum-Welch iterative algorithm to obtain values of, $A^{source}$, the state transition probability matrix, values for $B^{source}$, the observation symbol probability distribution matrix (for discrete HMM models) and values of $\alpha_0^{source}$, the initial state probability distribution vector. If the HMM is ergodic, the values of the initial state probability distribution vector are determined from the state transition probability matrix.

The feature vectors that are generated from the consecutive signal frames may represent spectral properties of the signal frames, temporal properties of the signal frame or any combination of these. The spectral properties may be expressed in the form of Discrete Fourier Transform coefficients, Linear Predictive Coding parameters, cepstrum parameters or corresponding differential cepstrum parameters.

If a discrete HMM or HMMs are utilised, the codebook, may have been determined by an off-line training procedure which utilised real-life sound source recordings. The number of feature vectors that constitutes the codebook may vary depending on the particular application, but for hearing aid applications, it has been found that a codebook comprising between 8 and 256 different feature vectors, such as 32-64 different feature vectors usually will provide an adequate coverage of the complete feature space. The comparison between each of the feature vectors computed from the consecutive signal frames and the codebook provides a symbol value which may be selected by choosing an integer index belonging to that codebook entry nearest to the feature vector in question. Thus, the output of this vector quantization process may be a sequence of integer indexes representing the corresponding symbol values.

To generate the codebook so as to closely resemble feature vectors that is generated in the hearing prosthesis during on-line processing of the input signal, i.e. normal use, the real life sound recordings may have been made by passing the signal through an input signal path of a target hearing prosthesis. By adopting such a procedure, frequency response deviations as well as other linear and/or non-linear distortions generated by the input signal path of the target hearing prosthesis can be compensated by introducing corresponding signal characteristics into the codebook. Thus, a close resemblance between the feature vector set and on-line generated feature vectors is secured to optimise recognition and classification results from the subsequent processing in the discrete Hidden Markov Model or Models. A similar advantageous effect may, naturally, be obtained by performing a pre-processing of the real-life sound recordings which is substantially similar to the processing of the input signal path of a target hearing prosthesis before extraction of the feature vector set or codebook is performed. The latter solution could be implemented by applying suitable analogue and/or digital filters or filter algorithms to the input signal tailored to simulate a priori known characteristics of the input signal path in question.

While it has proven helpful to utilise so-called left-to-right Hidden Markov Models in the field of speech recognition where the known temporal characteristics of words and utterances are matched in a structure of the model, the present inventors have found it advantageous to use at least one ergodic Hidden Markov Model, and, preferably, to use ergodic Hidden Markov Models for all applied Hidden Markov Models. An ergodic Hidden Markov Model is a model in which it is possible to reach any internal state from any other internal state in the model.

The number of internal model states of any particular HMM of the plurality of HMMs may depend on the particular type of predetermined sound source modelled. A relatively simple nearly constant noise source may be adequately modelled by a HMM with only a few internal states while more complex sound sources such as speech or mixed speech and complex noise sources may require additional internal states. Preferably, the at least one Hidden Markov Model or each of the plurality of Hidden Markov Models comprises between 2 and 10 states, such as between 3 and 8 states. According to a preferred embodiment of the invention, four discrete HMMs are used in a proprietary DSP in a hearing instrument, where each of the four HMMs has 4 internal states. The four internal states are associated with four common predetermined sound sources: speech source, traffic noise source, multi-talker or babble source, and subway noise source, respectively. A codebook with 64 feature vectors, each consisting of 12 delta-cepstrum parameters, is utilised to provide vector quantisation of the feature vectors derived from the input signal of the hearing aid. However, the feature vector set may comprise between 8 and 256 different feature vectors, such as 32-64 different feature vectors without taking up excessive amount of memory in the hearing aid DSP.

The processing means may be adapted to process the input signal in accordance with at least two different predetermined signal processing algorithms, each being associated with a set of algorithm parameters, where the processing means are further adapted to control a transition between the at least two predetermined signal processing algorithms in dependence of the element value(s) of the classification vector. This embodiment of the invention is particularly useful where the hearing prosthesis is equipped with two closely spaced microphones, such as a pair of omni-directional microphones, generating a pair of input signals which can be utilised to provide a directional signal mode by well-known delay-subtract techniques and a non-directional signal mode, e.g. by processing only one of the input signals. The processing means may control a transition between the directional and the omni-directional mode in a smooth manner through a range of intermediate values of the algorithm parameters so that the directionality of the processed output signal gradually increases/decreases. The user will thus not experience abrupt changes in the reproduced sound but rather e.g. a smooth improvement in signal to noise ratio.

To control such transitions between two predetermined signal processing algorithms, the processing means may further comprise a decision controller adapted to monitor the elements of the classification vector and control transitions between the plurality of Hidden Markov Models in accordance with a predetermined set of rules. The decision controller may advantageously operate as an intermediate layer between the classification vector provided by the HMMs and the one or plurality of related algorithm parameters. By monitoring element values of the classification vector and controlling the value(s) of the related algorithm parameter(s) in accordance with rules about maximum and minimum switching times between HMMs and, optionally, interpolation characteristics between the algorithm parameters, the inherent time scales that the HMMs operates on can be smoothed. If for example, a number of discrete HMMs operates on consecutive symbol values that each represent a time frame of about 6 ms, it may be advantageous to lowpass filter or smooth rapid transitions between a speech HMM and babble noise HMM that are caused by pauses between words in conversational speech in a "cocktail party" type listening environment. Instead of performing an instantaneous switch between the two predetermined signal processing algorithms for every model transition, suitable time constants and hysteresis could be provided in the decision controller.

According to a preferred embodiment of the invention, the decision controller comprises a second set of HMMs operating on a substantially longer time scale of the input signal than the HMM(s) in a first layer. Thereby, the processing means are adapted to process the observation sequence of symbol values or the feature vectors with a first set of Hidden Markov Models operating at a first time scale and associated with a first set of predetermined sound sources to determine element values of a first classification vector. Subsequently, the first classification vector is processed with the second set of Hidden Markov Models operating at a second time scale and associated with a second set of predetermined sound sources to determine element values of a second classification vector.

The first time scale is preferably selected within the range 10-100 ms to allow the first set of HMMs to operate on individual signal features of common speech and noise signals and the second time scale is preferably selected within the range 1-60 seconds such as about 10 or 20 seconds to allow the second set of HMMs to operate on changes between different listening environments. Environmental changes usually occur when the user of the hearing prosthesis moves between differing listening environments, e.g. a subway station and the interior of a train or a domestic environment, or between an interior of a car and standing near a street with bypassing traffic etc.

A second aspect of the invention relates to a method of generating automatic classification of input signals in a hearing prosthesis, the method comprising the steps of:

receiving an acoustic signal from a listening environment by a microphone of the hearing prosthesis to generate an input signal, processing the input signal in accordance with a predetermined signal processing algorithm and a plurality of related algorithm parameters stored in a memory area to generate a processed output signal, segmenting the input signal into consecutive signal frames of time duration, $T_{frame}$, generating respective feature vectors, O(t), representing predetermined signal features of the consecutive signal frames, processing the feature vectors with at least one Hidden Markov Model, $\lambda^{source}=\{A^{source}, b(O(t)), \alpha_0^{source}\}$, associated with a predetermined sound source to determine element value(s) of a classification vector indicating a probability of the predetermined sound source being active in the listening environment, controlling one or several values of the related algorithm parameters in dependence of element value(s) of the classification vector to control characteristics of the processed output signal, converting the processed output signal into an electrical or an acoustic output signal or signals by one or several output transducers, thereby adapting characteristics of the predetermined signal processing algorithm to the current listening environment; wherein $A^{source}$=A state transition probability matrix;

b(O(t))=Probability function for the observation O(t) for each state of the at least one Hidden Markov Model;

$\alpha_0^{source}$=An initial state probability distribution vector.

The feature vectors may be subjected to a vector quantisation process by comparing each of the respective feature vectors, O(t), with a feature vector set or codebook, and determine, for substantially each feature vector, an associated symbol value so as to generate an observation sequence of symbol values associated with the consecutive signal frames. By processing the observation sequence of symbol values with at least one discrete Hidden Markov Model, $\lambda^{source}=\{A^{source}, B^{source}, \alpha_0^{source}\}$, associated with the predetermined sound source, the element value or values of the classification vector may be determined; wherein $B^{source}$=An observation symbol probability distribution matrix.

For hearing aid applications, it has been found useful to utilise at least a few HMMs in order to recognise at least a few corresponding and common listening environments so that the method may comprise processing the feature vectors with a plurality of Hidden Markov Models, or process the observation sequence of symbol values vectors with a plurality of discrete Hidden Markov Models. According to this embodiment of the invention, each of the discrete Hidden Markov Models or the Hidden Markov Models is associated with a respective predetermined sound source to determine the element values of the classification vector, each element value indicating a probability of the respective predetermined sound source being active in the current listening environment.

According to a third aspect of the invention, a set of HMMs are utilised to recognise respective isolated words to provide the hearing prosthises with a capability of identifying a small set of voice commands which the user may utilise to control one or several functions of the hearing aid by his/hers voice. For this word recognition feature, discrete left-right HMMs are preferably utilised rather than the ergodic HMMs that it was preferred to applly to the task of providing automatic listening enviroment classification. Since a left-right HMM is a special case of an ergodic HMM, the HMM structure that is used for the above-described ergodic HMMs may be at least partly re-used for the left-right HMMs. This has the advantage that DSP memory and other hardware resources may be shared in a hearing prosthesis that provides both automatic listening enviroment classification and word recognition. Preferably, a number of isolated word HMMs, such as 2-8 HMMs, is stored in the hearing prosthesis to allow the processing means to recognise a corresponding number of distinct words. The output from each of the isolated word HMMs is a probability for a modelled word being spoken. Each of the isolated word HMMs must be trained on the particular word or command it must recognise during on-line processing of the input signal. The training could be performed by applying a concatenated sound source recording including the particular word or command spoken by a number of different individuals to the associated HMM. Alternatively, the training of the isolated word HMMs could be performed during a fitting session where the words or commands modelled were spoken by the user himself to provide a personalised recognition function in the user's hearing prosthesis.

BRIEF DESCRIPTION OF THE DRAWINGS

A preferred embodiment of a software programmable DSP based hearing aid according to the invention is described in the following with reference to the drawings, wherein.

DETAILED DESCRIPTION OF A PREFERRED EMBODIMENT

In the following, a specific embodiment of a three chip-set DSP based hearing aid according to the invention is described and discussed in greater detail. The present description discusses in detail only an operation of the signal processing part of a DSP-core or kernel with associated memory circuits. An overall circuit topology that may form basis of the DSP hearing aid is well known to the skilled person and is, accordingly, reviewed in very general terms only.

Figure 1:
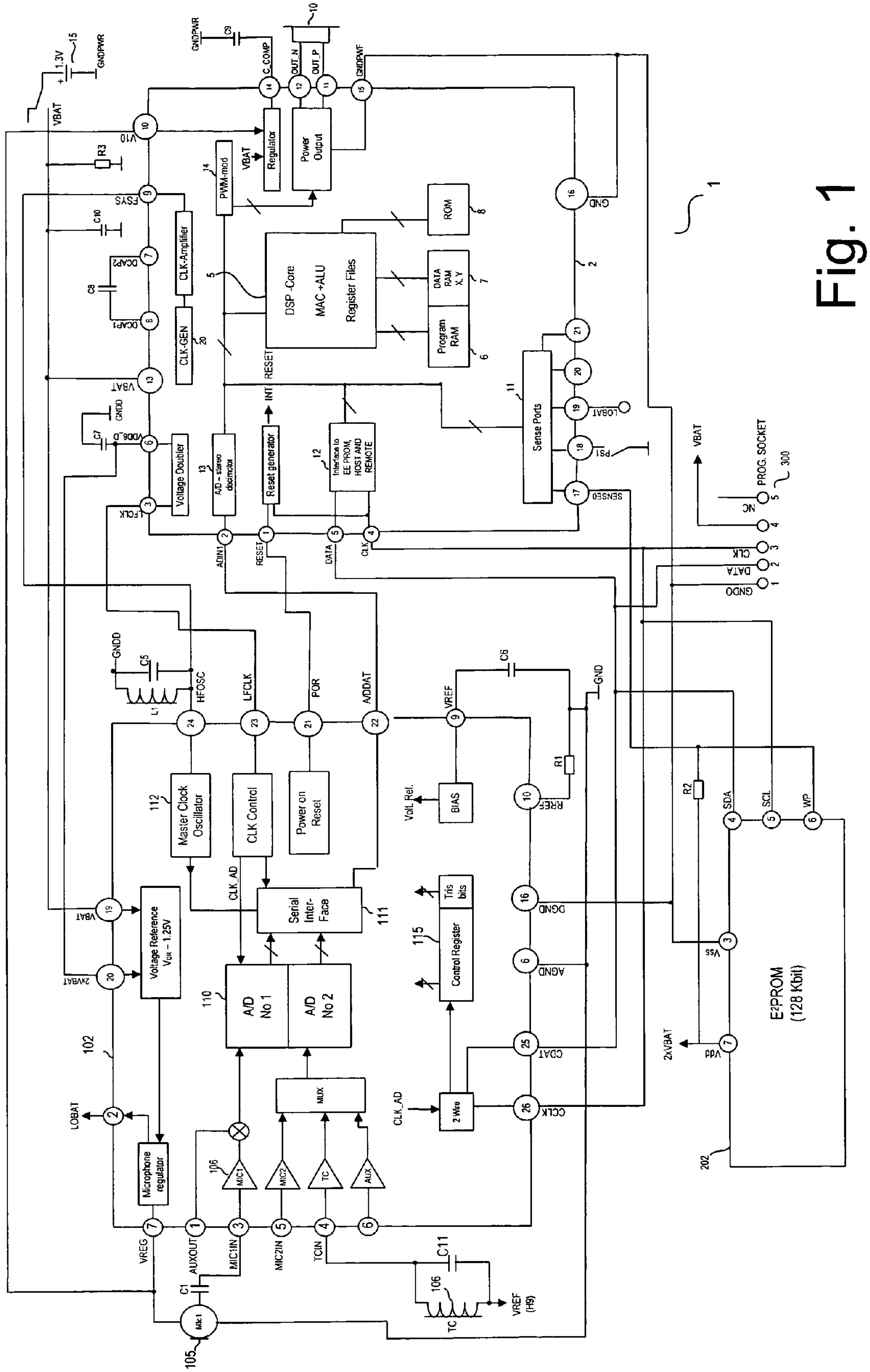
FIG. 1 is a simplified block diagram of three-chip DSP based hearing aid utilising Hidden Markov Models for input signal classification according to the invention.

In the simplified block diagram of FIG. 1, a conventional hearing aid microphone 105 receives an acoustic signal from a surrounding listening environment. The microphone 105 provides an analogue input signal on terminal MIC1IN of a proprietary A/D integrated circuit 102. The analogue input signal is amplified in a microphone preamplifier 106 and applied to an input of a first AID converter of a dual A/D converter circuit 110 comprising two synchronously operating converters of the sigma-delta type. A serial digital data stream or signal is generated in a serial interface circuit 111 and transmitted from terminal A/DDAT of the proprietary A/D integrated circuit 102 to a proprietary Digital Signal Processor circuit 2 (DSP circuit). The DSP circuit 2 comprises an A/D decimator 13 which is adapted to receive the serial digital data stream and convert it into corresponding 16 bit audio samples at a lower sampling rate for further processing in a DSP core 5. The DSP core 5 has an associated program Random Read Memory (program RAM) 6, data RAM 7 and Read Only Memory (ROM) 8. The signal processing of the DSP core 5, which is described below with reference to the signal flow diagram in FIG. 2 is controlled by program instructions read from the program RAM 6.

A serial bidirectional 2-wire programming interface 300 allows a host programming system (not shown) to communicate with the DSP circuit 2, over a serial interface circuit 12, and a commercially available EEPROM 202 to perform up/downloading of signal processing algorithms and/or associated algorithm parameter values.

A digital output signal generated by the DSP-core 5 from the analogue input signal is transmitted to a Pulse Width Modulator circuit 14 that converts received output samples to a pulse width modulated (PWM) and noise-shaped processed output signal. The processed output signal is applied to two terminals of hearing aid receiver 10 which, by its inherent low-pass filter characteristic converts the processed output signal to an corresponding acoustic audio signal. An internal clock generator and amplifier 20 receives a master clock signal from an LC oscillator tank circuit formed by L1 and CS that in co-operation with an internal master clock circuit 112 of the A/D circuit 102 forms a master clock for both the DSP circuit and the A/D circuit 102. The DSP-core 5 may be directly clocked by the master clock signal or from a divided clock signal. The DSP-core 5 is preferably clocked with a frequency of about 2-4 MHz.

Figure 2:
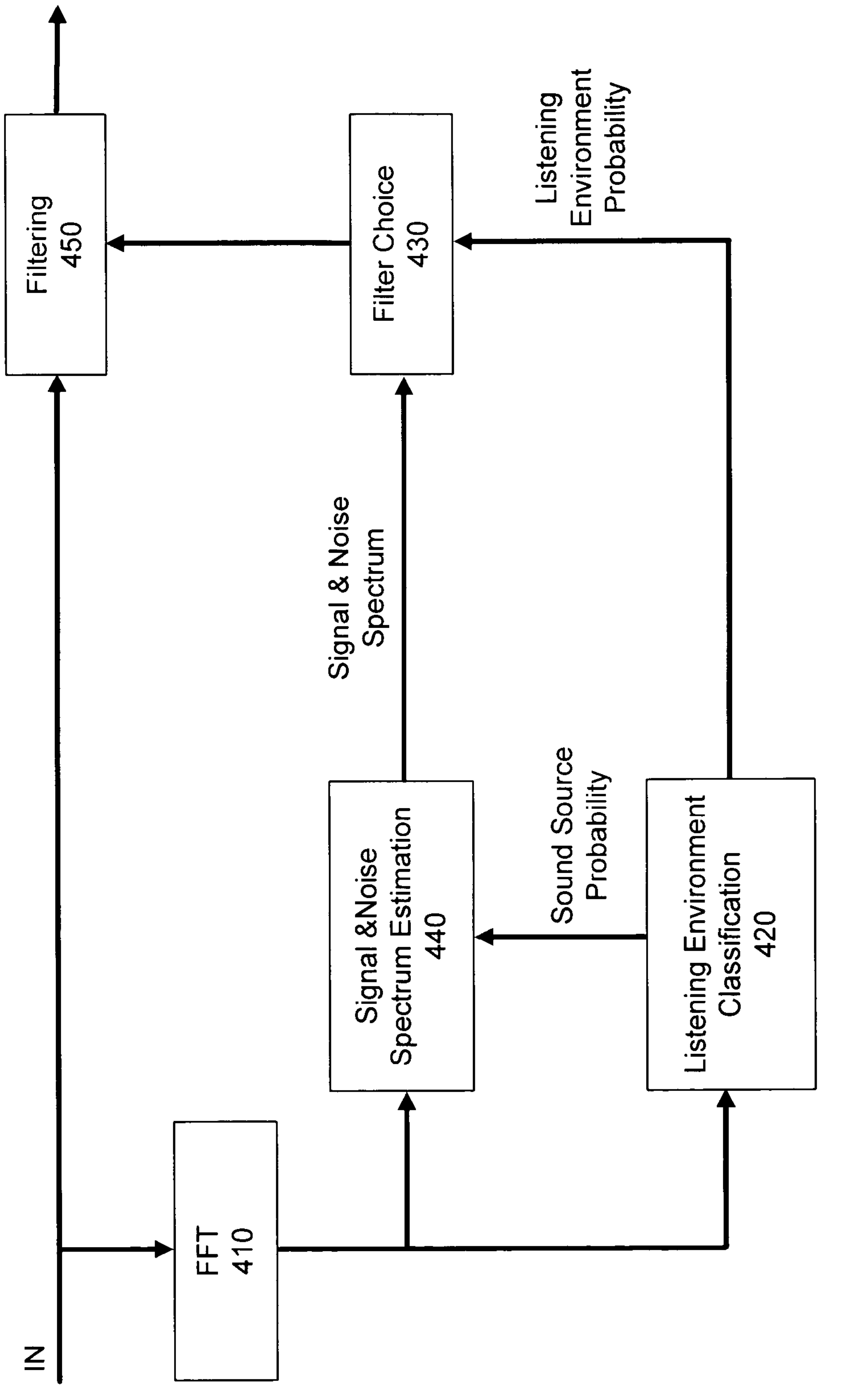
FIG. 2 is a signal flow diagram of a predetermined signal processing algorithm executed on the three-chip DSP based hearing aid shown in FIG. 1.

FIG. 2 illustrates a relatively simple application of discrete Hidden Markov Models to control algorithm parameter values of a predetermined signal processing algorithm of the DSP based hearing aid shown in FIG. 1. The discrete Hidden Markov Models are used in the hearing aid or instrument to provide automatic classification of three different listening environments, speech in traffic noise, speech in babble noise, and clean speech as illustrated in FIG. 4. In the present embodiment of the invention, each listening environment is connected with a particular pre-set frequency response implemented by FIR-filter block 450 that receives its filter parameter values from a filter choice controller 430. Operations of both the FIR-filter block 450 and the filter choice controller 430 are preferably performed by respective subroutines executed on the DSP core 5. Switching between different FIR-filter parameter values is automatically performed when the user of the hearing aid is moving between different listening environments which is detected by an listening environmental classification algorithm 420, comprising two sets of discrete HMMs operating at differing time scales as will be explained with reference to FIGS. 3 and 4. Another possibility is to let the listening environmental classifier 420 supplement an additional multi-channel AGC algorithm or system, which could be inserted between the input (IN) and the FIR-filter block 450, calculating, or determining by table lookup, gain values for consecutive signal frames of the input signal.

The user may have a favorite frequency response/gain for each of the listening environments that can be recognized/classified by its corresponding discrete Hidden Markov Model. These favorite frequency responses/gains may be found by applying a number of standard prescription methods, such as NAL, POGO etc, combined with individual interactive fine-tuning methods.

In FIG. 2, a raw input signal at node IN, provided by the output of the A/D decimator 13 in FIG. 1, is segmented to form consecutive signal frames, each with a duration of 6 ms. The input signal is preferably sampled at 16 kHz at this node so that each frame consists of 96 audio signal samples. The signal processing is performed along of two different paths, in a classification path through signal blocks 410, 420, 440 and 430, and a predetermined signal processing path through block 450. Pre-computed impulse responses of the respective FIR filters are stored in the data RAM during program execution. The choice of parameter values or coefficients for the FIR filter block 450 is performed by the Filter Choice Block 430 based on the element values of the classification vector, and, optionally, on data from the Spectrum Estimation Block 440.

Figure 3:
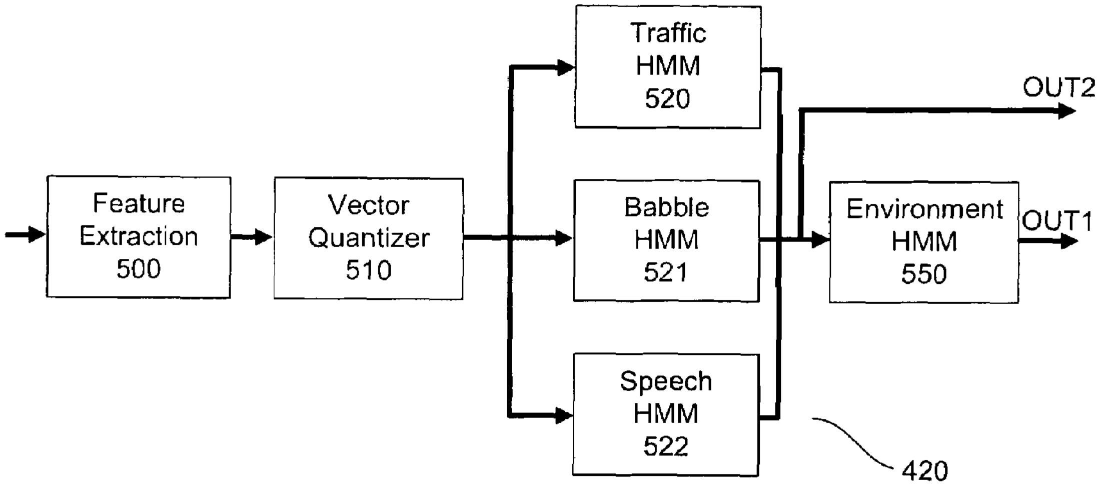
FIG. 3 is signal flow diagram illustrating a listening environment classification process.
Figure 4:
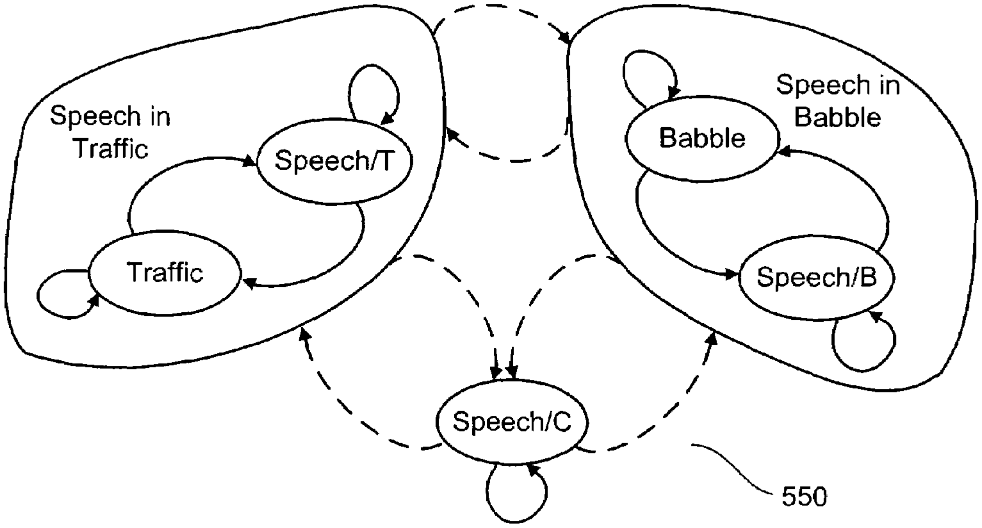
FIG. 4 is a state diagram for the environment Hidden Markov Model shown in FIG. 3 as block 550.

FIG. 3 shows a signal flow diagram of a preferred implementation of the classification block 420 of FIG. 2. A vector quantizer (VQ) block 510 precedes the dual layer HMM architecture, where blocks 520, 521, 522 is a first HMM layer and block 550 is a second HMM layer. The system therefore consists of four stages: a feature extraction layer 500, a sound feature classification layer 510, the first HMM layer in the form of a sound source classification layer 520-522 and a second HMM layer in the form of a listening environment classification layer 550. The sound source classification layer uses three or five Hidden Markov Models and a single HMM is used in the listening environment classification layer 550.

The structure of the classification block 420 makes it possible to have different switching times between different listening environments, e.g. slow switching between traffic and babble and fast switching between traffic and speech.

The output signal OUT1 of classification block 420 is a classification vector, in which each element contains the probability that a particular sound source of the three pre-determined sound sources 520, 521, 522 modelled by their respective discrete HMMs is active. The output signal OUT2 is another classification vector, in which each element contains the probability that a particular listening environment is active.

The processing of the input signal in the above-mentioned classification path is described in the following with reference to the implementation in FIG. 3:

The input at time t is a block x(t), of size B, with input signal samples.

$$x(t)=[x_1(t)\ x_2(t)\ \ldots\ x_B(t)]^T$$

x(t) is multiplied with a window, $w_n$, and the Discrete Fourier Transform, DFT, is calculated.

$$X_k(t) = \frac{1}{B}\sum_{n=0}^{B-1} w_n x_n(t) e^{-\frac{j2\pi\lambda n}{B}} \quad k = 0 \ldots B/2-1$$

A feature vector is extracted or computed for every new frame. It is presently preferred to use 12 cepstrum parameters for each feature vector:

$$c_k(t) = \sum_{n=0}^{B/2-1} \cos\left(\frac{2\pi kn}{B}\right) \log|X_n(t)| \quad k = 0 \ldots 11$$

The output at time t is a feature column vector, f(t), with continuous valued elements.

$$f(t)=[C_0(t)\ c_1(t)\ \ldots\ c_{11}(t)]^T$$

The corresponding differential cepstrum parameter vector (often called delta-cepstrum), is calculated as $$\Delta f(t) = \sum_{i=0}^{K-1} h_i f(t-i),$$

where $h_i$ is determined such that Δf(t) approximates the first differential of f(t) with respect to the time t. A preferred length of the filter defined by coefficients $h_i$ is K=8.

The delta-cepstrum coefficients are sent to the vector quantizer in the classification block 420. Other features, e.g. time domain features or other frequency-based features, may be added.

The classification block 420 comprises three layers operating at different time scales: (1) a Short-term Layer (Sound Feature Classification) 510, operating instantly on each signal frame, (2) a Medium-term Layer (Sound Source Classification) 501-522, operating in the time-scale of envelope modulations within predetermined sound sources modelled by the four HMMs, and (3) a Long-term Layer (Listening Environment Classification) 550, operating in a slower time-scale corresponding to shifts between different sound sources in a given listening environment or the shift between different listening environments. This is further illustrated in FIG. 4.

The predetermined sound sources modelled by the present embodiment of the invention are traffic noise source, babble noise source, and a clean speech source but could also comprise mixed sound sources that each may contain a predetermined proportion of e.g. speech and babble or speech and traffic noise as illustrated in FIG. 4. The final output of the classifier is a listening environment probability vector, OUT1, continuously indicating a current probability estimate for each listening environment, and a sound source probability vector, OUT2, indicating the estimated probability for each sound source. A listening environment may consist of one of the predetermined sound sources 520-522 or a combination of two or more of the predetermined sound sources as illustrated in more detail in the description of FIG. 4.

The input to the vector quantizer block 510 is a feature vector with continuously valued elements. The vector quantizer has M, e.g 32, codewords in the codebook $[c^1 \ldots c^M]$ approximating the complete feature space. The feature vector is quantized to closest codeword in the codebook and the index o(t), an integer index between 1 and M, to the closest codeword is generated as output.

$$O(t) = \operatorname*{argmin}_{i=1,M} \|\Delta f(t) - c^i\|^2$$

The VQ is trained off-line with the Generalized Lloyd algorithm (Linde, 1980). Training material consisted of real-life recordings of sounds-source samples. These recordings have been made through the input signal path, shown on FIG. 1, of the DSP based hearing instrument.

Each of the three sound sources is modelled by a respective discrete HMM. Each HMM consists of a state transition probability matrix, $A^{source}$, an observation symbol probability distribution matrix, $B^{source}$, and an initial state probability distribution column vector, $\alpha_0^{source}$. A compact notation for a HMM is $\lambda^{source}=\{A^{source}, B^{source}, \alpha_0^{source}\}$. Each sound source model has N=4 internal states and observes the stream of VQ symbol values or centroid indices $[O(\mathbf{1}) \ldots O(t)]$ $O_t \epsilon[\mathbf{1},M]$. The current state at time t is modelled as a stochastic variable $Q^{source}(t) \in \{\mathbf{1}, \ldots, N\}$.

The purpose of the medium-term layer is to estimate how well each source model can explain the current input observation O(t). The output is a column vector u(t) with elements indicating the conditional probabilities $\phi^{source}(t)=\text{prob}(O(t)|O(t-1), \ldots, O(\mathbf{1}),\lambda^{source})$ for each source.

The standard forward algorithm (Rabiner, 1989) is used to update recursively the state probability column vector $p^{source}(t)$. The elements $p_1^{source}(t)$ of this vector indicate the conditional probability that the sound source is in state i, $$p_1^{source}(t)=\text{prob}(Q^{source}(t)=i,o(t)|o(t-1), \ldots, o(1), \lambda^{source}).$$

The recursive update equations are:

$$p^{source}(t) = ((A^{source})^T \hat{p}^{source}(t-1)) \circ b^{source}(o(t))$$

$$\phi^{source}(t) = prob(o(t) \mid o(t-1), \ldots, o(1), \lambda^{source}) = \sum_{i=1}^{N} p_i^{source}(t)$$

$$\hat{p}_i^{source}(t) = p_i^{source}(t) \Big/ \sum_{i=1}^{N} p_i^{source}(t)$$

wherein operator ° defines element-wise multiplication.

FIG. 4 shows in more detail a slightly modified version of dual layer HMM structure illustrated in FIG. 3 so that the first layer of HMMs 520-522 comprises two additional HMMs, a fourth HMM modelling a predetermined sound source of “speech in traffic noise” and fifth HMM modelling a predetermined sound source “speech in cafeteria babble”.

Signal OUT1 of the final HMM layer 550 estimates current probabilities for each of the modelled listening environment by observing the stream of sound source probability vectors from the previous layer of HMMs. The listening environment is represented by a discrete stochastic variable $E(t)\epsilon\{1 \ldots 3\}$, with outcomes coded as 1 for “speech in traffic noise”, 2 for “speech in cafeteria babble”, 3 for “clean speech”. Thus, the output probability vector or classification vector has three elements, one for each of these environments. The final HMM layer 550 contains five states representing Traffic noise, Speech (in traffic, “Speech/T”), Babble, Speech (in babble, “Speech/B”), and Clean Speech (“Speech/C”). Transitions between listening environments, indicated by dashed arrows, have low probability, and transitions between states within one listening environment, shown by solid arrows, have relatively high probabilities.

The final HMM layer 550 consists of a Hidden Markov Model with five states and transition probability matrix $A^{env}$ (FIG. 4). The current state in the environment hidden Markov model is modelled as a discrete stochastic variable $S(t) \in\{1 \ldots 5\}$, with outcomes coded as 1 for “traffic”, 2 for speech (in traffic noise, “speech/T”), 3 for “babble”, 4 for speech (in babble, “speech/B”), and 5 for clean speech “speech/C”.

The speech in traffic noise listening environment, E(t)=1, has two states S(t)=1 and S(t)=2. The speech in cafeteria babble listening situation, E(t)=2, has two states S(t)=3 and S(t)=4. The clean speech listening environment, E(t)=3, has only one state, S(t)=5. The transition probabilities between listening environments are relatively low and the transition probabilities between states within a listening environment are high.

The environment Hidden Markov Model 550 observes the stream of vectors $[u(\mathbf{1}) \ldots u(t)]$, where $u(t)=[\phi^{traffic}(t)\ \phi^{speech}(t)\ \phi^{babble}(t)\ \phi^{speech}(t)\ \phi^{speech}(t)]^T$ containing observation probabilities for each state. The probability for being in astate given the current and all previous observations and given the environment Hidden Markov Model, $\hat{p}_1^{env}=\text{prob}(S(t)=i|u(t), \ldots, u(\mathbf{1}),A^{env})$, is calculated with the forward algorithm (Rabiner, 1989), $$p^{env}(t)=((A^{env})^T\hat{p}^{env}(t-1))\cdot u(t),$$

with elements $$p_i^{env}=\text{prob}(S(t)=i,u(t)|u(t-1), \ldots, u(1), A^{env}),$$

and finally, with normalization, $$\hat{p}^{env}(t)=p^{env}(t)/\Sigma p_i^{env}(t).$$

The probability for each listening environment, $p^E(t)$, given all previous observations and given the environment hidden Markov model, can now be calculated as $$p^E(t) = \begin{pmatrix} 1 & 1 & 0 & 0 & 0 \\ 0 & 0 & 1 & 1 & 0 \\ 0 & 0 & 0 & 0 & 1 \end{pmatrix} \hat{p}^{env}(t).$$

As previously mentioned, the spectrum estimation block 440 of FIG. 2 is optional but may be utilized to estimate an average frequency spectrum which adapts slowly to the current listening environment. Another possibility is to estimate two or more slowly adapting spectra for different sound sources in a given listening environment, e.g. one speech spectrum and one noise spectrum.

The source probabilities, $\phi^{source}(t)$, the environment probabilities $p^E(t)$, and the current log power spectrum, X(t), are used to estimate the current signal and noise log power spectra. Two low-pass filters are used in the estimation, one filter for the signal spectrum and one filter for the noise spectrum. The signal spectrum is updated if $p_1^E(t)>p_2^E(t)$ and $\phi^{speech}(t)>\phi^{traffic}(t)$ or if $p_2^E(t)>p_1^E(t)$ and $\phi^{speech}(t)>\phi^{babble}(t)$. The noise spectrum is updated if $p_1^E(t)>p_2^E(t)$ and $\phi^{traffic}(t)>\phi^{speech}(t)$ or if $p_2^E(t)>p_1^E(t)$ and $\phi^{babble}(t)>\phi^{speech}(t)$.

Notation

M Number of centroids in Vector Quantizer

N Number of States in HMM $\lambda^{source}=\{A^{source}, B^{source}, \pi^{source}\}$ compact notation for a discrete HMM, describing a source, with N states and M observation symbols B Blocksize $O=[O_{-\infty} \ldots O_1]$ Observation sequence $O_t \in [1,M]$ Discrete observation at time t f(t) Feature vector w Window of size B x(t) One block of size B, at time t, of raw input samples X(t) The corresponding discrete complex spectrum, of size B, at time t

REFERENCES

L. R. Rabiner, A Tutorial on Hidden Markov Models and Selected Applications in Speech Recognition. Proc. IEEE, vol. 77, no. 2, February 1989

Linde, Y., Buzo, A., and Gray, R. M. An Algorithm for Vector Quantizer Design. IEEE Trans. Comm., COM-28: 84-95, January 1980.

The invention claimed is:

1. A hearing prosthesis comprising:

a microphone adapted to generate an input signal in response to receiving an acoustic signal from a listening environment;

an output transducer for converting a processed output signal into an electrical or an acoustic output signal;

processing means adapted to process the input signal in accordance with a predetermined signal processing algorithm and related algorithm parameters to generate the processed output signal;

a memory area storing values of the related algorithm parameters for the predetermined signal processing algorithm;

the processing means being further adapted to:

segment the input signal into consecutive signal frames of time duration, $T_{frame}$, and generate respective feature vectors, O(t), representing predetermined signal features of the consecutive signal frames, compare each of the feature vectors, O(t), with a feature vector set to determine, for substantially each feature vector, an associated symbol value so as to generate an observation sequence of symbol values associated with the consecutive signal frames, wherein the feature vector set has been determined in an off-line training procedure which utilized real-life sound source recordings made through an input signal path of a target hearing prosthesis or by performing a substantially similar signal processing of an input signal to simulate characteristics of the input signal path, and stored in non-volatile memory locations of the hearing prosthesis, process the observation sequence of symbol values with at least one discrete Hidden Markov Model, $\lambda^{source}=\{A^{source}, B^{source}, \alpha_0^{source}\}$, associated with a predetermined sound source to determine element value(s) of a classification vector indicating a probability of the predetermined sound source being active in the listening environment, control one or several values of the related algorithm parameters in dependence of the element value(s) of the classification vector, thereby adapting characteristics of the predetermined signal processing algorithm to the current listening environment, wherein $A^{source}$=A state transition probability matrix, $B^{source}$=An observation symbol probability distribution matrix for an input observation O(t) for each state of the at least one Hidden Markov Model, and $\alpha_0^{source}$=An initial state probability distribution vector.

2. A hearing prosthesis according to claim 1, wherein the processing means are adapted to process the observation sequence of symbol values with a plurality of discrete Hidden Markov Models associated with respective predetermined sound sources to determine the element values of the classification vector indicating a probability of each predetermined sound source.

3. A hearing prosthesis according to claim 1, wherein the feature vectors are associated with respective integer symbol values during a vector quantization process.

4. A hearing prosthesis according to claim 1, wherein the feature vector set comprises between 8 and 256 discrete symbols.

5. A hearing prosthesis according to claim 2, wherein the processing means further comprises a decision controller adapted to smooth inherent time scales of the plurality of discrete Hidden Markov Models by monitoring element values of the classification vector and control the one or several values of the related algorithm parameters.

6. A hearing prosthesis according to claim 5, wherein the decision controller comprises a Hidden Markov Model operating on a substantially longer time scale of the input signal than the inherent time scales of the plurality of discrete Hidden Markov Models.

7. A hearing prosthesis according to claim 5, wherein the inherent time scales of the plurality of discrete Hidden Markov Models are selected within a range of 10-100 milliseconds and the substantially longer time scale of the Hidden Markov Model is selected within a range of 1-60 seconds.

8. A hearing prosthesis according to claim 1, wherein the predetermined sound source is constituted by a mixture of speech and/or traffic noise and/or babble noise mixed together in a predetermined proportion.

9. A hearing prosthesis according to claim 1, wherein the predetermined sound source is a mixture of speech and babble noise with a particular target signal to noise ratio.

10. A hearing prosthesis according to claim 1, wherein each of the feature vectors comprises a plurality of cepstrum parameters or differential cepstrum parameters representing the predetermined signal features of the consecutive signal frames.

11. A hearing prosthesis comprising:

a microphone adapted to generate an input signal in response to receiving an acoustic signal from a listening environment;

an output transducer for converting a processed output signal into an electrical or an acoustic output signal;

processing means adapted to process the input signal in accordance with a predetermined signal processing algorithm and related algorithm parameters to generate the processed output signal;

a memory area storing values of the related algorithm parameters for the predetermined signal processing algorithm;

the processing means being further adapted to:

segment the input signal into consecutive signal frames of time duration, $T_{frame}$, and generate respective feature vectors, O(t), representing predetermined signal features of the consecutive signal frames, compare each of the feature vectors, O(t), with a feature vector set to determine, for substantially each feature vector, an associated symbol value so as to generate an observation sequence of symbol values associated with the consecutive signal frames, process the observation sequence of symbol values with a plurality of discrete Hidden Markov Models, $\lambda^{source}=\{A^{source}, B^{source}, \alpha_0^{source}\}$, associated with respective predetermined sound sources to determine element values of a classification vector indicating a probability of each predetermined sound source being active in the listening environment, wherein the processing means further comprises a decision controller adapted to smooth inherent time scales of the plurality of discrete Hidden Markov Models by monitoring element values of the classification vector and control the one or several values of the related algorithm parameters, control one or several values of the related algorithm parameters in dependence of the element value(s) of the classification vector, thereby adapting characteristics of the predetermined signal processing algorithm to the current listening environment, wherein $A^{source}$=A state transition probability matrix, $B^{source}$=An observation symbol probability distribution matrix for an input observation O(t) for each state of the at least one Hidden Markov Model, and $\alpha_0^{source}$=An initial state probability distribution vector.

12. A hearing prosthesis according to claim 11, wherein the feature vectors are associated with respective integer symbol values during a vector quantization process.

13. A hearing prosthesis according to claim 11, wherein the feature vector set comprises between 8 and 256 discrete symbols.

14. A hearing prosthesis according to claim 11, wherein the feature vector set has been determined in an off-line training procedure which utilized real-life sound source recordings and stored in non-volatile memory locations of the hearing instrument.

15. A hearing prosthesis according to claim 11, wherein the decision controller comprises a Hidden Markov Model operating on a substantially longer time scale of the input signal than the inherent time scales of the plurality of discrete Hidden Markov Models.

16. A hearing prosthesis according to claim 11, wherein the inherent time scales of the plurality of discrete Hidden Markov Models are selected with.in a range of 10-100 milliseconds and the substantially longer time scale of the Hidden Markov Model is selected within a range of 1-60 seconds.

17. A hearing prosthesis according to claim 11, wherein the predetermined sound source is constituted by a mixture of speech and/or traffic noise and/or babble noise mixed together in a predetermined proportion.

18. A hearing prosthesis according to claim 11, wherein the predetermined sound source is a mixture of speech and babble noise with a particular target signal to noise ratio.

19. A hearing prosthesis according to claim 11, wherein each of the feature vectors comprises a plurality of cepstrum parameters or differential cepstrum parameters representing the predetermined signal features of the consecutive signal frames.

20. A hearing prosthesis comprising:

a microphone adapted to generate an input signal in response to receiving an acoustic signal from a listening environment;

an output transducer for converting a processed output signal into an electrical or an acoustic output signal;

processing means adapted to process the input signal in accordance with a predetermined signal processing algorithm and related algorithm parameters to generate the processed output signal;

a memory area storing values of the related algorithm parameters for the predetermined signal processing algorithm;

the processing means being further adapted to:

segment the input signal into consecutive signal frames of time duration, $T_{frame}$, and generate respective feature vectors, O(t), representing predetermined signal features of the consecutive signal frames, wherein the value of $T_{frame}$ lies between 1 and 100 milliseconds, compare each of the feature vectors, O(t), with a feature vector set to determine, for substantially each feature vector, an associated symbol value so as to generate an observation sequence of symbol values associated with the consecutive signal frames, process the observation sequence of symbol values with at least one discrete Hidden Markov Model, $\lambda^{source}=\{A^{source}, B^{source}, \alpha_0^{source}\}$, associated with a predetermined sound source to determine element value(s) of a classification vector indicating a probability of the predetermined sound source being active in the listening environment, control one or several values of the related algorithm parameters in dependence of the element value(s) of the classification vector, thereby adapting characteristics of the predetermined signal processing algorithm to the current listening environment, wherein $A^{source}$=A state transition probability matrix, $B^{source}$=An observation symbol probability distribution matrix for an input observation O(t) for each state of the at least one Hidden Markov Model, and $\alpha_0^{source}$=An initial state probability distribution vector.

21. A hearing prosthesis according to claim 20, wherein the value of $T_{frame}$ lies between 5 and 10 milliseconds.

22. A hearing prosthesis according to claim 20, wherein the processing means are adapted to process the observation sequence of symbol values with a plurality of discrete Hidden Markov Models associated with respective predetermined sound sources to determine the element values of the classification vector indicating a probability of each predetermined sound source.

23. A hearing prosthesis according to claim 20, wherein the feature vectors are associated with respective integer symbol values during a vector quantization process.

24. A hearing prosthesis according to claim 20, wherein the feature vector set comprises between 8 and 256 discrete symbols.

25. A hearing prosthesis according to claim 20, wherein the feature vector set has been determined in an off-line training procedure which utilized real-life sound source recordings and stored in non-volatile memory locations of the hearing instrument.

26. A hearing prosthesis according to claim 25, wherein the real-life sound recordings have been made through an input signal path of a target hearing prosthesis or by performing a substantially similar signal processing of an input signal to simulate characteristics of the input signal path.

27. A hearing prosthesis according to claim 22, wherein the processing means further comprises a decision controller adapted to smooth inherent time scales of the plurality of discrete Hidden Markov Models by monitoring element values of the classification vector and control the one or several values of the related algorithm parameters.

28. A hearing prosthesis according to claim 27, wherein the decision controller comprises a Hidden Markov Model operating on a substantially longer time scale of the input signal than the inherent time scales of the plurality of discrete Hidden Markov Models.

29. A hearing prosthesis according to claim 27, wherein the inherent time scales of the plurality of discrete Hidden Markov Models are selected within a range of 10-100 milliseconds and the substantially longer time scale of the Hidden Markov Model is selected within a range of 1-60 seconds.

30. A hearing prosthesis according to claim 20, wherein the predetermined sound source is constituted by a mixture of speech and/or traffic noise and/or babble noise mixed together in a predetermined proportion.

31. A hearing prosthesis according to claim 20, wherein the predetermined sound source is a mixture of speech and babble noise with a particular target signal to noise ratio.

32. A hearing prosthesis according to claim 20, wherein each of the feature vectors comprises a plurality of cepstrum parameters or differential cepstrum parameters representing the predetermined signal features of the consecutive signal frames.

33. A hearing prosthesis comprising:

a microphone adapted to generate an input signal in response to receiving an acoustic signal from a listening environment;

an output transducer for converting a processed output signal into an electrical or an acoustic output signal;

processing means adapted to process the input signal in accordance with a predetermined signal processing algorithm and related algorithm parameters to generate the processed output signal;

a memory area storing values of the related algorithm parameters for the predetermined signal processing algorithm;

the processing means being further adapted to:

segment the input signal into consecutive signal frames of time duration, $T_{frame}$, and generate respective feature vectors, O(t), representing predetermined signal features of the consecutive signal frames, compare each of the feature vectors, O(t), with a feature vector set to determine, for substantially each feature vector, an associated symbol value so as to generate an observation sequence of symbol values associated with the consecutive signal frames, process the observation sequence of symbol values with at least one ergodic Hidden Markov Model, $\lambda^{source}=\{A^{source}, B^{source}, \alpha_0^{source}\}$, associated with a predetermined sound source to determine element value(s) of a classification vector indicating a probability of the predetermined sound source being active in the listening environment, control one or several values of the related algorithm parameters in dependence of the element value(s) of the classification vector, thereby adapting characteristics of the predetermined signal processing algorithm to the current listening environment, wherein $A^{source}$=A state transition probability matrix, $B^{source}$=An observation symbol probability distribution matrix for an input observation, and O(t) for each state of the at least one Hidden Markov Model $\alpha_0^{source}$=An initial state probability distribution vector.

34. A hearing prosthesis according to claim 33, wherein the processing means are adapted to process the observation sequence of symbol values with a plurality of discrete Hidden Markov Models associated with respective predetermined sound sources to determine the element values of the classification vector indicating a probability of each predetermined sound source.

35. A hearing prosthesis according to claim 33, wherein the feature vectors are associated with respective integer symbol values during a vector quantization process.

36. A hearing prosthesis according to claim 33, wherein the feature vector set comprises between 8 and 256 discrete symbols.

37. A hearing prosthesis according to claim 33, wherein the feature vector set has been determined in an off-line training procedure which utilized real-life sound source recordings and stored in non-volatile memory locations of the hearing instrument.

38. A hearing prosthesis according to claim 37, wherein the real-life sound recordings have been made through an input signal path of a target hearing prosthesis or by performing a substantially similar signal processing of an input signal to simulate characteristics of the input signal path.

39. A hearing prosthesis according to claim 33, wherein the processing means further comprises a decision controller adapted to smooth inherent time scales of the plurality of discrete Hidden Markov Models by monitoring element values of the classification vector and control the one or several values of the related algorithm parameters.

40. A hearing prosthesis according to claim 39, wherein the decision controller comprises a Hidden Markov Model operating on a substantially longer time scale of the input signal than the inherent time scales of the plurality of discrete Hidden Markov Models.

41. A hearing prosthesis according to claim 39, wherein the inherent time scales of the plurality of discrete Hidden Markov Models are selected within a range of 10-100 milliseconds and the substantially longer time scale of the Hidden Markov Model is selected within a range of 1-60 seconds.

42. A hearing prosthesis according to claim 33, wherein the predetermined sound source is constituted by a mixture of speech and/or traffic noise and/or babble noise mixed together in a predetermined proportion.

43. A hearing prosthesis according to claim 33, wherein the predetermined sound source is a mixture of speech and babble noise with a particular target signal to noise ratio.

44. A hearing prosthesis according to claim 33, wherein each of the feature vectors comprises a plurality of cepstrum parameters or differential cepstrum parameters representing the predetermined signal features of the consecutive signal frames.

45. A hearing prosthesis comprising:

a microphone adapted to generate an input signal in response to receiving an acoustic signal from a listening environment;

an output transducer for converting a processed output signal into an electrical or an acoustic output signal;

processing means adapted to process the input signal in accordance with a predetermined signal processing algorithm and related algorithm parameters to generate the processed output signal;

a memory area storing values of the related algorithm parameters for the predetermined signal processing algorithm;

the processing means being further adapted to:

segment the input signal into consecutive signal frames of time duration, $T_{frame}$, and generate respective feature vectors, O(t), representing predetermined signal features of the consecutive signal frames, compare each of the feature vectors, O(t), with a feature vector set to determine, for substantially each feature vector, an associated symbol value so as to generate an observation sequence of symbol values associated with the consecutive signal frames, process the observation sequence of symbol values with at least one discrete Hidden Markov Model, $\lambda^{source}=\{A^{source}, B^{source}, \alpha_0^{source}\}$, associated with a predetermined sound source to determine element value(s) of a classification vector indicating a probability of the predetermined sound source being active in the listening environment, wherein the predetermined sound source is constituted by a mixture of speech andlor traffic noise andlor babble noise mixed together in a predetermined proportion, control one or several values of the related algorithm parameters in dependence of the element value(s) of the classification vector, thereby adapting characteristics of the predetermined signal processing algorithm to the current listening environment, wherein $A^{source}$=A state transition probability matrix, $B^{source}$=An observation symbol probability distribution matrix for an input observation O(t) for each state of the at least one Hidden Markov Model, and $\alpha_0^{source}$=An initial state probability distribution vector.

46. A hearing prosthesis according to claim 45, wherein the processing means are adapted to process the observation sequence of symbol values with a plurality of discrete Hidden Markov Models associated with respective predetermined sound sources to determine the element values of the classification vector indicating a probability of each predetermined sound source.

47. A hearing prosthesis according to claim 45, wherein the feature vectors are associated with respective integer symbol values during a vector quantization process.

48. A hearing prosthesis according to claim 45, wherein the feature vector set comprises between 8 and 256 discrete symbols.

49. A hearing prosthesis according to claim 45, wherein the feature vector set has been determined in an off-line training procedure which utilized real-life sound source recordings and stored in non-volatile memory locations of the hearing instrument.

50. A hearing prosthesis according to claim 49, wherein the real-life sound recordings have been made through an input signal path of a target hearing prosthesis or by performing a substantially similar signal processing of an input signal to simulate characteristics of the input signal path.

51. A hearing prosthesis according to claim 46, wherein the processing means further comprises a decision controller adapted to smooth inherent time scales of the plurality of discrete Hidden Markov Models by monitoring element values of the classification vector and control the one or several values of the related algorithm parameters.

52. A hearing prosthesis according to claim 51, wherein the decision controller comprises a Hidden Markov Model operating on a substantially longer time scale of the input signal than the inherent time scales of the plurality of discrete Hidden Markov Models.

53. A hearing prosthesis according to claim 51, wherein the inherent time scales of the plurality of discrete Hidden Markov Models are selected within a range of 10-100 milliseconds and the substantially longer time scale of the Hidden Markov Model is selected within a range of 1-60 seconds.

54. A hearing prosthesis according to claim 45, wherein each of the feature vectors comprises a plurality of cepstrum parameters or differential cepstrum parameters representing the predetermined signal features of the consecutive signal frames.

55. A hearing prosthesis comprising:

a microphone adapted to generate an input signal in response to receiving an acoustic signal from a listening environment;

an output transducer for converting a processed output signal into an electrical or an acoustic output signal;

processing means adapted to process the input signal in accordance with a predetermined signal processing algorithm and related algorithm parameters to generate the processed output signal;

a memory area storing values of the related algorithm parameters for the predetermined signal processing algorithm;

the processing means being further adapted to:

segment the input signal into consecutive signal frames of time duration, $T_{frame}$, and generate respective feature vectors, O(t), representing predetermined signal features of the consecutive signal frames, compare each of the feature vectors, O(t), with a feature vector set to determine, for substantially each feature vector, an associated symbol value so as to generate an observation sequence of symbol values associated with the consecutive signal frames, process the observation sequence of symbol values with at least one discrete Hidden Markov Model, $\lambda^{source}=\{A^{source}, B^{source}, \alpha_0^{source}\}$, associated with a predetermined sound source to determine element value(s) of a classification vector indicating a probability of the predetermined sound source being active in the listening environment, wherein the predetermined sound source is a mixture of speech and babble noise with a particular target signal to noise ratio, control one or several values of the related algorithm parameters in dependence of the element value(s) of the classification vector, thereby adapting characteristics of the predetermined signal processing algorithm to the current listening environment, wherein $A^{source}$=A state transition probability matrix, $B^{source}$=An observation symbol probability distribution matrix for an input observation O(t) for each state of the at least one Hidden Markov Model, and $\alpha_0^{source}$=An initial state probability distribution vector.

56. A hearing prosthesis according to claim 55, wherein the processing means are adapted to process the observation sequence of symbol values with a plurality of discrete Hidden Markov Models associated with respective predetermined sound sources to determine the element values of the classification vector indicating a probability of each predetermined sound source.

57. A hearing prosthesis according to claim 55, wherein the feature vectors are associated with respective integer symbol values during a vector quantization process.

58. A hearing prosthesis according to claim 55, wherein the feature vector set comprises between 8 and 256 discrete symbols.

59. A hearing prosthesis according to claim 55, wherein the feature vector set has been determined in an off-line training procedure which utilized real-life sound source recordings and stored in non-volatile memory locations of the hearing instrument.

60. A hearing prosthesis according to claim 59, wherein the real-life sound recordings have been made through an input signal path of a target hearing prosthesis or by performing a substantially similar signal processing of an input signal to simulate characteristics of the input signal path.

61. A hearing prosthesis according to claim 56, wherein the processing means further comprises a decision controller adapted to smooth inherent time scales of the plurality of discrete Hidden Markov Models by monitoring element values of the classification vector and control the one or several values of the related algorithm parameters.

62. A hearing prosthesis according to claim 61, wherein the decision controller comprises a Hidden Markov Model operating on a substantially longer time scale of the input signal than the inherent time scales of the plurality of discrete Hidden Markov Models.

63. A hearing prosthesis according to claim 61, wherein the inherent time scales of the plurality of discrete Hidden Markov Models are selected within a range of 10-100 milliseconds and the substantially longer time scale of the Hidden Markov Model is selected within a range of 1-60 seconds.

64. A hearing prosthesis according to claim 55, wherein each of the feature vectors comprises a plurality of cepstrum parameters or differential cepstrum parameters representing the predetermined signal features of the consecutive signal frames.

65. A hearing prosthesis comprising:

a microphone adapted to generate an input signal in response to receiving an acoustic signal from a listening environment;

an output transducer for converting a processed output signal into an electrical or an acoustic output signal;

processing means adapted to process the input signal in accordance with a predetermined signal processing algorithm and related algorithm parameters to generate the processed output signal;

a memory area storing values of the related algorithm parameters for the predetermined signal processing algorithm;

the processing means being further adapted to:

segment the input signal into consecutive signal frames of time duration, $T_{frame}$, and generate respective feature vectors, O(t), representing predetermined signal features of the consecutive signal frames, wherein each of the feature vectors comprises a plurality of cepstrum parameters or differential cepstrum parameters representing the predetermined signal features of the consecutive signal frames, compare each of the feature vectors, O(t), with a feature vector set to determine, for substantially each feature vector, an associated symbol value so as to generate an observation sequence of symbol values associated with the consecutive signal frames, process the observation sequence of symbol values with at least one discrete Hidden Markov Model, $\lambda^{source}=\{A^{source}, B^{source}, \alpha_0^{source}\}$, associated with a predetermined sound source to determine element value(s) of a classification vector indicating a probability of the predetermined sound source being active in the listening environment, control one or several values of the related algorithm parameters in dependence of the element value(s) of the classification vector, thereby adapting characteristics of the predetermined signal processing algorithm to the current listening environment, wherein $A^{source}$=A state transition probability matrix, $B^{source}$=An observation symbol probability distribution matrix for an input observation O(t) for each state of the at least one Hidden Markov Model, and $\alpha_0^{source}$=An initial state probability distribution vector.

66. A hearing prosthesis according to claim 65, wherein the processing means are adapted to process the observation sequence of symbol values with a plurality of discrete Hidden Markov Models associated with respective predetermined sound sources to determine the element values of the classification vector indicating a probability of each predetermined sound source.

67. A hearing prosthesis according to claim 65, wherein the feature vectors are associated with respective integer symbol values during a vector quantization process.

68. A hearing prosthesis according to claim 65, wherein the feature vector set comprises between 8 and 256 discrete symbols.

69. A hearing prosthesis according to claim 65, wherein the feature vector set has been determined in an off-line training procedure which utilized real-life sound source recordings and stored in non-volatile memory locations of the hearing instrument.

70. A hearing prosthesis according to claim 69, wherein the real-life sound recordings have been made through an input signal path of a target hearing prosthesis or by performing a substantially similar signal processing of an input signal to simulate characteristics of the input signal path.

71. A hearing prosthesis according to claim 66, wherein the processing means further comprises a decision controller adapted to smooth inherent time scales of the plurality of discrete Hidden Markov Models by monitoring element values of the classification vector and control the one or several values of the related algorithm parameters.

72. A hearing prosthesis according to claim 71, wherein the decision controller comprises a Hidden Markov Model operating on a substantially longer time scale of the input signal than the inherent time scales of the plurality of discrete Hidden Markov Models.

73. A hearing prosthesis according to claim 71, wherein the inherent time scales of the plurality of discrete Hidden Markov Models are selected within a range of 10-100 milliseconds and the substantially longer time scale of the Hidden Markov Model is selected within a range of 1-60 seconds.

74. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment the input signal into consecutive signal frames of time duration $T^{frame}$, and generate respective feature vectors, O(t), representing predetermined signal features of the consecutive signal frames, wherein the value of $T_{frame}$ lies between 1 and 100 milliseconds, process the feature vectors with one or more Hidden Markov Models operating on a first time scale and associated with respective predetermined sound sources to determine element values of a first classification vector indicating a probability of the predetermined sound sources being active in the listening environment, process the first classification vector with a Hidden Markov Model operating at a second time scale and associated with one or more predetermined sound sources to determine element values of the classification vector, control one or several values of the related algorithm parameters in dependence of element values of the classification vector, thereby adapting characteristics of the predetermined signal processing algorithm to the current listening environment.

75. A hearing prosthesis according to claim 74, wherein the value of $T_{frame}$ lies between 5 and 10 milliseconds.

76. A hearing prosthesis according to claim 74, wherein the first time scale is selected within the range 10-100 milliseconds, and the second time scale is selected within the range 1-60 seconds.

77. A hearing prosthesis according to claim 74, wherein the one or more Hidden Markov Models comprises between 2 and 10 states.

78. A hearing prosthesis according to claim 74, wherein the predetermined sound sources are constituted by a mixture of speech and/or traffic noise and/or babble noise mixed together in a predetermined proportion.

79. A hearing prosthesis according to claim 74, wherein the predetermined sound sources are mixtures of speech and babble noise with a particular target signal to noise ratio.

80. A hearing prosthesis according to claim 74, wherein each of the feature vectors comprises a plurality of cepstrum parameters or differential cepstrum parameters representing the predetermined signal features of the consecutive signal frames.

81. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment the input signal into consecutive signal frames of time duration $T^{frame}$, and generate respective feature vectors, O(t), representing predetermined signal features of the consecutive signal frames, process the feature vectors with the one or more Hidden Markov Models operating on a first time scale and associated with respective predetermined sound sources to determine element values of a first classification vector indicating a probability of the predetermined sound sources being active in the listening environment, process the first classification vector with a Hidden Markov Model operating at a second time scale and associated with one or more predetermined sound sources to determine element values of the classification vector, wherein the first time scale is selected within the range 10-100 ms and the second time scale is selected within the range 1-60 seconds, control one or several values of the related algorithm parameters in dependence of element values of the classification vector, thereby adapting characteristics of the predetermined signal processing algorithm to the current listening environment.

82. A hearing prosthesis according to claim 81, wherein the one or more Hidden Markov Models comprises between 2 and 10 states.

83. A hearing prosthesis according to claim 81, wherein the predetermined sound sources are constituted by a mixture of speech and/or traffic noise and/or babble noise mixed together in a predetermined proportion.

84. A hearing prosthesis according to claim 81, wherein the predetermined sound sources are mixtures of speech and babble noise with a particular target signal to noise ratio.

85. A hearing prosthesis according to claim 81, wherein each of the feature vectors comprises a plurality of cepstrum parameters or differential cepstrum parameters representing the predetermined signal features of the consecutive signal frames.

86. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment the input signal into consecutive signal frames of time duration $T^{frame}$, and generate respective feature vectors, O(t), representing predetermined signal features of the consecutive signal frames, process the feature vectors with the one or more ergodic Hidden Markov Models operating on a first time scale and associated with respective predetermined sound sources to determine element values of a first classification vector indicating a probability of the predetermined sound sources being active in the listening environment, process the first classification vector with a Hidden Markov Model operating at a second time scale and associated with one or more predetermined sound sources to determine element values of the classification vector, control one or several values of the related algorithm parameters in dependence of element values of the classification vector, thereby adapting characteristics of the predetermined signal processing algorithm to the current listening environment.

87. A hearing prosthesis according to claim 86, wherein the first time scale is selected within the range 10-100 milliseconds, and the second time scale is selected within the range 1-60 seconds.

88. A hearing prosthesis according to claim 86, wherein the predetermined sound sources are constituted by a mixture of speech and/or traffic noise and/or babble noise mixed together in a predetermined proportion.

89. A hearing prosthesis according to claim 86, wherein the predetermined sound sources are mixtures of speech and babble noise with a particular target signal to noise ratio.

90. A hearing prosthesis according to claim 86, wherein each of the feature vectors comprises a plurality of cepstrum parameters or differential cepstrum parameters representing the predetermined signal features of the consecutive signal frames.

91. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment the input signal into consecutive signal frames of time duration $T^{frame}$, and generate respective feature vectors, O(t), representing predetermined signal features of the consecutive signal frames, process the feature vectors with the one or more Hidden Markov Models operating on a first time scale and associated with respective predetermined sound sources to determine element values of a first classification vector indicating a probability of the predetermined sound sources being active in the listening environment, process the first classification vector with a Hidden Markov Model operating at a second time scale and associated with one or more predetermined sound sources to determine element values of the classification vector, wherein the predetermined sound sources are constituted by a mixture of speech and/or traffic noise and/or babble noise mixed together in a predetermined proportion, control one or several values of the related algorithm parameters in dependence of element values of the classification vector, thereby adapting characteristics of the predetermined signal processing algorithm to the current listening environment.

92. A hearing prosthesis according to claim 91, wherein the first time scale is selected within the range 10-100 milliseconds, and the second time scale is selected within the range 1-60 seconds.

93. A hearing prosthesis according to claim 91, wherein each of the feature vectors comprises a plurality of cepstrum parameters or differential cepstrum parameters representing the predetermined signal features of the consecutive signal frames.

94. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment the input signal into consecutive signal frames of time duration $T^{frame}$, and generate respective feature vectors, O(t), representing predetermined signal features of the consecutive signal frames, process the feature vectors with the one or more Hidden Markov Models operating on a first time scale and associated with respective predetermined sound sources to determine element values of a first classification vector indicating a probability of the predetermined sound sources being active in the listening environment, process the first classification vector with a Hidden Markov Model operating at a second time scale and associated with one or more predetermined sound sources to determine element values of the classification vector, wherein the predetermined sound sources are mixtures of speech and babble noise with a particular target signal to noise ratio, control one or several values of the related algorithm parameters in dependence of element values of the classification vector, thereby adapting characteristics of the predetermined signal processing algorithm to the current listening environment.

95. A hearing prosthesis according to claim 94, wherein the first time scale is selected within the range 10-100 milliseconds, and the second time scale is selected within the range 1-60 seconds.

96. A hearing prosthesis according to claim 94, wherein each of the feature vectors comprises a plurality of cepstrum parameters or differential cepstrum parameters representing the predetermined signal features of the consecutive signal frames.

97. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment the input signal into consecutive signal frames of time duration $T^{frame}$, and generate respective feature vectors, O(t), representing predetermined signal features of the consecutive signal frames, wherein each of the feature vectors comprises a plurality of cepstrum parameters or differential cepstrum parameters representing the predetermined signal features of the consecutive signal frames, process the feature vectors with the one or more Hidden Markov Models operating on a first time scale and associated with respective predetermined sound sources to determine element values of a first classification vector indicating a probability of the predetermined sound sources being active in the listening environment, process the first classification vector with a Hidden Markov Model operating at a second time scale and associated with one or more predetermined sound sources to determine element values of the classification vector, wherein the predetermined sound sources are mixtures of speech and babble noise with a particular target signal to noise ratio, control one or several values of the related algorithm parameters in dependence of element values of the classification vector, thereby adapting characteristics of the predetermined signal processing algorithm to the current listening environment.

98. A hearing prosthesis according to claim 97, wherein the first time scale is selected within the range 10-100 milliseconds, and the second time scale is selected within the range 1-60 seconds.

99. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with at least two predetermined signal processing algorithms and respective sets of algorithm parameters to generate the processed output signal, a memory area storing values of the respective algorithm parameters for the at least two predetermined signal processing algorithms, the processing means being further adapted to:

segment an input signal into consecutive signal frames of time duration, $T_{frame}$, and generate respective feature vectors, O(t), representing predetermined signal features of the consecutive signal frames, wherein the value of $T_{frame}$ lies between 1 and 100 milliseconds, process the feature vectors with at least one Hidden Markov Model $\lambda^{source}=\{A^{source}, b(O(t)), \alpha_0^{source}\}$, associated with a predetermined sound source to determine element values of a classification vector indicating a probability of the predetermined sound source being active in the listening environment, control a transition between the at least two predetermined signal processing algorithms in dependence of element values of the classification vector, wherein:

$A^{source}$=A state probability matrix, b(O(t))=Probability function for an input observation O(t) for each state of the at least one Hidden Markov Model, and $\alpha_0^{source}$=An initial state probability distribution vector.

100. A hearing prosthesis according to claim 99, wherein the value of $T_{frame}$ lies between 5 and 10 milliseconds.

101. A hearing prosthesis according to claim 99, comprising a pair of omni-directional microphones generating a pair of input signals to provide the hearing prosthesis with a directional signal mode and a non-directional signal mode and wherein the processing means control the transition between the directional and non-directional signal mode.

102. A hearing prosthesis according to claim 99, wherein the predetermined sound source is constituted by a mixture of speech and/or traffic noise andlor babble noise mixed together in a predetermined proportion.

103. A hearing prosthesis according to claim 99, wherein the predetermined sound source is a mixture of speech and babble noise with a particular target signal to noise ratio.

104. A hearing prosthesis according to claim 99, wherein each of the feature vectors comprises a plurality of cepstrum parameters or differential cepstrum parameters representing the predetermined signal features of the consecutive signal frames.

105. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with at least two predetermined signal processing algorithms and respective sets of algorithm parameters to generate the processed output signal, a memory area storing values of the respective algorithm parameters for the at least two predetermined signal processing algorithms, the processing means being further adapted to:

segment an input signal into consecutive signal frames of time duration, $T_{frame}$, and generate respective feature vectors, O(t), representing predetermined signal features of the consecutive signal frames, process the feature vectors with at least one ergodic Hidden Markov Model $\lambda^{source}=\{A^{source}, b(O(t)), \alpha_0^{source}\}$, associated with a predetermined sound source to determine element values of a classification vector indicating a probability of the predetermined sound source being active in the listening environment, control a transition between the at least two predetermined signal processing algorithms in dependence of element values of the classification vector, wherein:

$A^{source}$=A state probability matrix, b(O(t))=Probability function for an input observation O(t) for each state of the at least one Hidden Markov Model, and $\alpha_0^{source}$=An initial state probability distribution vector.

106. A hearing prosthesis according to claim 105, comprising a pair of omni-directional microphones generating a pair of input signals to provide the hearing prosthesis with a directional signal mode and a non-directional signal mode and wherein the processing means control the transition between the directional and non-directional signal mode.

107. A hearing prosthesis according to claim 105, wherein the predetermined sound source is constituted by a mixture of speech and/or traffic noise and/or babble noise mixed together in a predetermined proportion.

108. A hearing prosthesis according to claim 105, wherein the predetermined sound source is a mixture of speech and babble noise with a particular target signal to noise ratio.

109. A hearing prosthesis according to claim 105, wherein each of the feature vectors comprises a plurality of cepstrum parameters or differential cepstrum parameters representing the predetermined signal features of the consecutive signal frames.

110. A hearing prosthesis comprising:

a pair of omni-directional microphones adapted to generate a pair of input signals in response to receiving an acoustic signal from a listening environment to provide the hearing prosthesis with a directional signal mode and a non-directional signal mode, an output transducer for converting a processed output signal into an electrical or an acoustic output signal, processing means adapted to process the pair of input signals in accordance with a respective pair of predetermined signal processing algorithms and respective sets of algorithm parameters to generate the processed output signal, a memory area storing values of the respective algorithm parameters for the at least two predetermined signal processing algorithms, the processing means being further adapted to:

segment an input signal into consecutive signal frames of time duration, $T_{frame}$, and generate respective feature vectors, O(t), representing predetermined signal features of the consecutive signal frames, process the feature vectors with at least one ergodic Hidden Markov Model $\lambda^{source}=\{A^{source}, b(O(t)), \alpha_0^{source}\}$, associated with a predetermined sound source to determine element values of a classification vector indicating a probability of the predetermined sound source being active in the listening environment, control a transition between the at least two predetermined signal processing algorithms in dependence of element values of the classification vector, wherein:

$A^{source}$=A state probability matrix, b(O(t))=Probability function for an input observation O(t) for each state of the at least one Hidden Markov Model, and $\alpha_0^{source}$=An initial state probability distribution vector.

111. A hearing prosthesis according to claim 110, wherein the predetermined sound source is constituted by a mixture of speech and/or traffic noise and/or babble noise mixed together in a predetermined proportion.

112. A hearing prosthesis according to claim 110, wherein the predetermined sound source is a mixture of speech and babble noise with a particular target signal to noise ratio.

113. A hearing prosthesis according to claim 110, wherein each of the feature vectors comprises a plurality of cepstrum parameters or differential cepstrum parameters representing the predetermined signal features of the consecutive signal frames.

114. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with at least two predetermined signal processing algorithms and respective sets of algorithm parameters to generate the processed output signal, a memory area storing values of the respective algorithm parameters for the at least two predetermined signal processing algorithms, the processing means being further adapted to:

segment an input signal into consecutive signal frames of time duration, $T_{frame}$, and generate respective feature vectors, O(t), representing predetermined signal features of the consecutive signal frames, process the feature vectors with at least one Hidden Markov Model $\lambda^{source}=\{A^{source}, b(O(t)), \alpha_0^{source}\}$, associated with a predetermined sound source to determine element values of a classification vector indicating a probability of the predetermined sound source being active in the listening environment, wherein the predetermined sound source is constituted by a mixture of speech and/or traffic noise and/or babble noise mixed together in a predetermined proportion, control a transition between the at least two predetermined signal processing algorithms in dependence of element values of the classification vector, wherein:

$A^{source}$=A state probability matrix, b(O(t))=Probability function for an input observation O(t) for each state of the at least one Hidden Markov Model, and $\alpha_0^{source}$=An initial state probability distribution vector.

115. A hearing prosthesis according to claim 114, comprising a pair of omni-directional microphones generating a pair of input signals to provide the hearing prosthesis with a directional signal mode and a non-directional signal mode and wherein the processing means control the transition between the directional and non-directional signal mode.

116. A hearing prosthesis according to claim 114, wherein each of the feature vectors comprises a plurality of cepstrum parameters or differential cepstrum parameters representing the predetermined signal features of the consecutive signal frames.

117. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with at least two predetermined signal processing algorithms and respective sets of algorithm parameters to generate the processed output signal, a memory area storing values of the respective algorithm parameters for the at least two predetermined signal processing algorithms, the processing means being further adapted to:

segment an input signal into consecutive signal frames of time duration, $T_{frame}$, and generate respective feature vectors, O(t), representing predetermined signal features of the consecutive signal frames, process the feature vectors with at least one Hidden Markov Model $\lambda^{source}=\{A^{source}, b(O(t)), \alpha_0^{source}\}$, associated with a predetermined sound source to determine element values of a classification vector indicating a probability of the predetermined sound source being active in the listening environment, wherein the predetermined sound source is a mixture of speech and babble noise with a particular target signal to noise ratio, control a transition between the at least two predetermined signal processing algorithms in dependence of element values of the classification vector, wherein:

$A^{source}$=A state probability matrix, b(O(t))=Probability function for an input observation O(t) for each state of the at least one Hidden Markov Model, and $\alpha_0^{source}$=An initial state probability distribution vector.

118. A hearing prosthesis according to claim 117, comprising a pair of omni-directional microphones generating a pair of input signals to provide the hearing prosthesis with a directional signal mode and a non-directional signal mode and wherein the processing means control the transition between the directional and non-directional signal mode.

119. A hearing prosthesis according to claim 117, wherein each of the feature vectors comprises a plurality of cepstrum parameters or differential cepstrum parameters representing the predetermined signal features of the consecutive signal frames.

120. A hearing prosthesis comprising:

a microphone adapted to generate an input signal in response to receiving an acoustic signal from a listening environment, an output transducer for converting a processed output signal into an electrical or an acoustic output signal, processing means adapted to process the input signal in accordance with at least two predetermined signal processing algorithms and respective sets of algorithm parameters to generate the processed output signal, a memory area storing values of the respective algorithm parameters for the at least two predetermined signal processing algorithms, the processing means being further adapted to:

segment an input signal into consecutive signal frames of time duration, $T_{frame}$, and generate respective feature vectors, O(t), representing predetermined signal features of the consecutive signal frames, wherein each of the feature vectors comprises a plurality of cepstrum parameters or differential cepstrum parameters representing the predetermined signal features of the consecutive signal frames, process the feature vectors with at least one Hidden Markov Model $\lambda^{source}=\{A^{source}, b(O(t)), \alpha_0^{source}\}$, associated with a predetermined sound source to determine element values of a classification vector indicating a probability of the predetermined sound source being active in the listening environment, control a transition between the at least two predetermined signal processing algorithms in dependence of element values of the classification vector, wherein:

$A^{source}$=A state probability matrix, b(O(t))=Probability function for an input observation O(t) for each state of the at least one Hidden Markov Model, and $\alpha_0^{source}$=An initial state probability distribution vector.

121. A hearing prosthesis according to claim 120, comprising a pair of omni-directional microphones generating a pair of input signals to provide the hearing prosthesis with a directional signal mode and a non-directional signal mode and wherein the processing means control the transition between the directional and non-directional signal mode.

122. A hearing prosthesis comprising:

a microphone adapted to generate an input signal in response to receiving an acoustic signal from a listening environment, an output transducer fro converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment an input signal into consecutive signal frames of time duration, $T_{frame}$ and generate respective feature vectors, O(t), representing predetermined signal features of the consecutive signal frames, wherein the value of $T_{frame}$ lies between 1 and 100 milliseconds, process the feature vectors with a set of Hidden Markov Models modeling respective isolated words or commands to determine element values of a classification vector indicating a probability of an isolated word or command being spoken, thereby making the hearing prosthesis capable of recognizing a corresponding set of isolated words or commands.

123. A hearing prosthesis according to claim 122, wherein the value of $T_{frame}$ lies between 5 and 10 milliseconds.

124. A hearing prosthesis according to claim 122, wherein the processing means is adapted to recognize voice commands from the user to control one or several functions of the hearing prosthesis.

125. A hearing prosthesis according to claim 122, wherein the set of Hidden Markov Models utilizes left-right Hidden Markov Models.

126. A hearing prosthesis according to claim 122, wherein a training of the set of Hidden Markov Models has been performed on words or commands spoken by the user during a fitting session.

127. A hearing prosthesis comprising:

a microphone adapted to generate an input signal in response to receiving an acoustic signal from a listening environment, an output transducer fro converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment an input signal into consecutive signal frames of time duration, $T_{frame}$ and generate respective feature vectors, O(t), representing predetermined signal features of the consecutive signal frames, process the feature vectors with a set of ergodic Hidden Markov Models modeling respective isolated words or commands to determine element values of a classification vector indicating a probability of an isolated word or command being spoken, thereby making the hearing prosthesis capable of recognizing a corresponding set of isolated words or commands.

128. A hearing prosthesis according to claim 127, wherein the processing means is adapted to recognize voice commands from the user to control one or several functions of the hearing prosthesis.

129. A hearing prosthesis according to claim 127, wherein the set of Hidden Markov Models utilizes left-right Hidden Markov Models.

130. A hearing prosthesis according to claim 127, wherein a training of the set of Hidden Markov Models has been performed on words or commands spoken by the user during a fitting session.

131. A hearing prosthesis comprising:

a microphone adapted to generate an input signal in response to receiving an acoustic signal from a listening environment, an output transducer fro converting a processed output signal into an electrical or an acoustic output signal, processing means adapted to process the input signal in accordance with a predetermined signal processing algorithm and related algorithm parameters to generate the processed output signal, a memory area storing values of the related algorithm parameters for the predetermined signal processing algorithm, the processing means being further adapted to:

segment an input signal into consecutive signal frames of time duration, $T_{frame}$ and generate respective feature vectors, O(t), representing predetermined signal features of the consecutive signal frames, wherein each of the feature vectors comprises a plurality of cepstrum parameters or differential cepstrum parameters representing the predetermined signal features of the consecutive signal frames, process the feature vectors with a set of Hidden Markov Models modeling respective isolated words or commands to determine element values of a classification vector indicating a probability of an isolated word or command being spoken, thereby making the hearing prosthesis capable of recognizing a corresponding set of isolated words or commands.

132. A hearing prosthesis according to claim 131, wherein the processing means is adapted to recognize voice commands from the user to control one or several functions of the hearing prosthesis.

133. A hearing prosthesis according to claim 131, wherein the set of Hidden Markov Models utilizes left-right Hidden Markov Models.

134. A hearing prosthesis according to claim 131, wherein a training of the set of Hidden Markov Models has been performed on words or commands spoken by the user during a fitting session.

* * * * *